July 6, 1965 K. O. HEINTZ 3,193,832
SEISMIC PRESENTATION
Filed Oct. 1, 1962 3 Sheets-Sheet 1
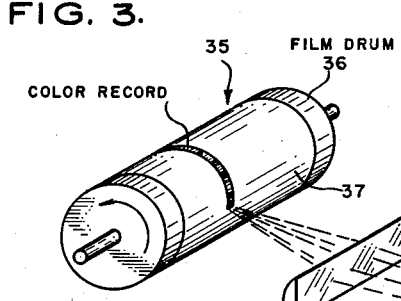
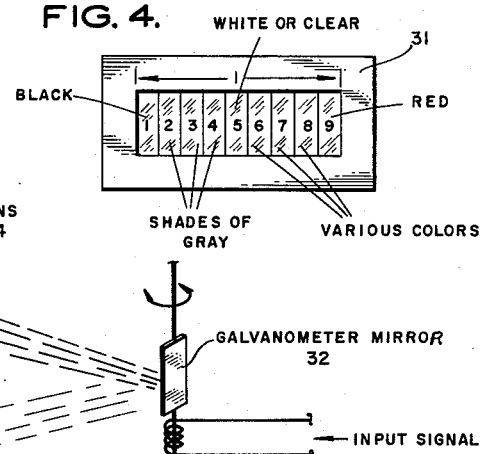
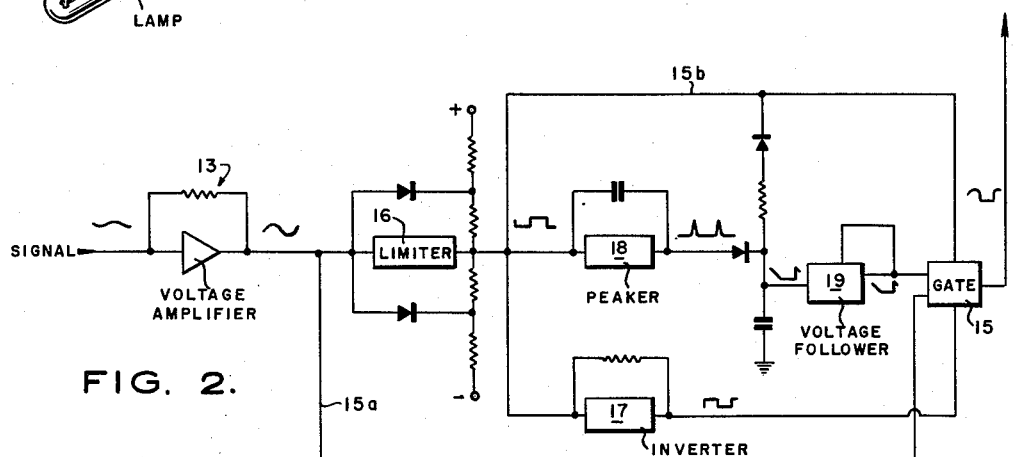
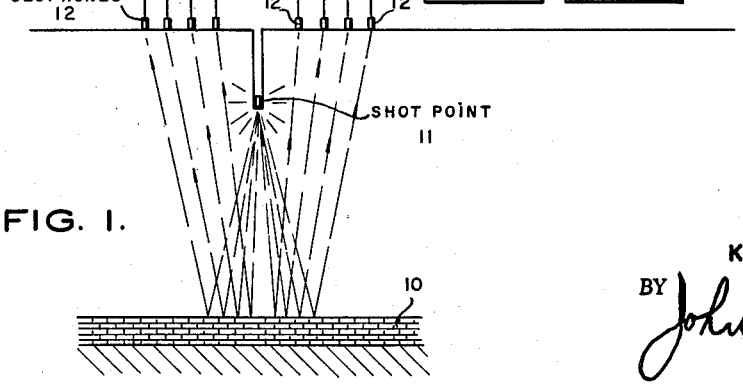
INVENTOR.
KARL O. HEINTZ,
BY
ATTORNEY.

FIG. 2A
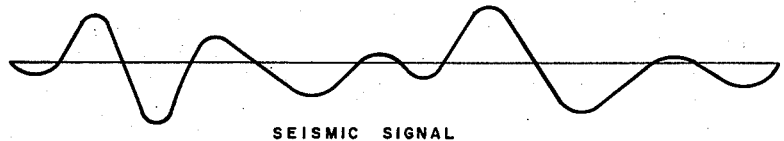
SEISMIC SIGNAL
SIGNAL SQUARED UP
FIG. 2B.
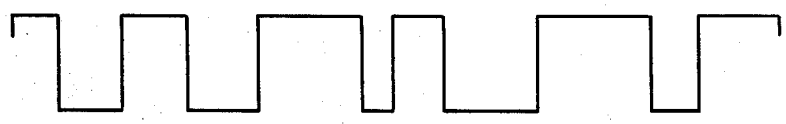
SIGNAL INVERTED
FIG. 2C.
VOLTAGE PROP. TO HALF CYCLE BREADTH
FIG. 2D.
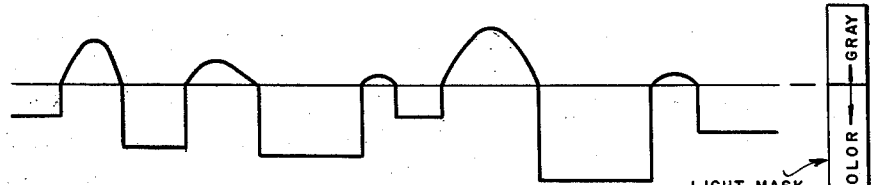
OUTPUT COMPOSITE OF FIGS. 2A & 2D
FIG. 2E.

July 6, 1965 K. O. HEINTZ 3,193,832
SEISMIC PRESENTATION
Filed Oct. 1, 1962 3 Sheets-Sheet 3

INVENTOR.
KARL O. HEINTZ,
BY
ATTORNEY.

United States Patent Office 3,193,832
Patented July 6, 1965

3,193,832
SEISMIC PRESENTATION
Karl O. Heintz, Houston, Tex., assignor, by mesne assignments, to Esso Production Research Company, Houston, Tex., a corporation of Delaware
Filed Oct. 1, 1962, Ser. No. 227,284
4 Claims. (Cl. 346—1)

The present invention concerns an improved method for recording together different parameters of seismic signals. More particularly, the invention concerns an improved method for photographically recording two different parameters of seismic signals, the parameters being visually distinguishable through variations in black, white, shades of grey, and colors. In a preferred embodiment the invention relates to method and apparatus in which one half-cycle of the seismic signal is displayed in shades of grey and black and white, and in the other half-cycle, a voltage proportional to the half-cycle breadth (frequency) of the seismic signal is displayed in various colors.

As is well known in geophysical prospecting, a seismic shock is imparted to the earth generally by means of an explosion and seismic waves generated by the explosion travel downwardly through the subsurface and these waves are reflected back to the surface by subterranean strata. The reflected waves are detected at spaced points on the earth's surface. These points are at selected distances from the explosion point, termed the "shock point." The depths of subsurface reflecting strata can be determined by measuring the time intervals between initiation of the explosion and detection of the reflected waves at the detection points. Various corrections may be made to adjust the arrival times of the reflected waves to compensate, for example, for differences in elevation of the shock point and the various detecting points, and to compensate for the low velocity layer of the earth at the several points. By placing the shock point and associated detecting points in different selected areas on the surface of the earth, recording a record of the reflected signals for each area, and placing these records side by side, a large cross section of the structure of the subsurface may be obtained.

Amplitude, frequency, total energy and other parameters of the seismic signals aid observers in determining the characteristics of subsurface structures. Various techniques have been used to present the signals in forms that are easier to analyze. One such technique is display of the signals in variable density or variable color forms in which the signals are reproduced as photographic traces which vary in intensity (blends of black and white) or in color in proportion to variations in amplitude or frequency or some other parameter of the signals. This technique is utilized in the present invention; however, instead of one, two parameters of the signal are reproduced as photographic traces—one in black, white, and shades of grey and the other in variable colors. Presenting two parameters together has advantages over previous presentations for a skilled observer is better able to interpret and analyze the seismic signals to ascertain information as to the nature of the subsurface formations such as porosity, bed thickness, slope, velocity, etc. Thus, by presenting together the parameters of amplitude (in shades of grey) and frequency (in colors) not only is the information provided by each individually presented in one record, but, in addition, one parameter relative to the other is displayed. Frequency changes may evidence changes in the porosity of a formation and when this information is directly coupled with information as to locations of reflecting beds, as evidenced by amplitude changes, the location and type of formation may be more accurately and more easily recognized.

Thus, a primary object of the present invention is to provide an improved technique for photographically recording seismic signals.

The term "frequency" as used herein means the number of times a signal wave form or seismic signal crosses the zero signal axis per unit of time. The term "zero crossing" means the crossing of a zero axis by the signal wave form. The term "half-cycle breadth" means the distance between two successive zero crossings.

Briefly, the invention comprises photographically recording two parameters of seismic signals in shades of grey and varying colors.

The preferred system for carrying out this method is one in which the positive half cycle of the seismic signal is displayed in shades of grey (from black to white) and a voltage proportional to the half-cycle breadth of the seismic signal is displayed in the remaining half cycle in varying colors and it includes a gating circuit which gates the seismic signal to permit passage of the positive half cycle and gates the voltage proportional to the half-cycle breadth to permit passage of this voltage in the remaining half cycle. The composite output signal of the gating circuit is transmitted to a reflecting mirror galvanometer which is pivotal on an axis that extends in a direction parallel to the direction in which a recording medium moves. A light source is arranged so that its beam is reflected to the recording medium by the mirror galvanometer; and a color scale means composed of a plurality of segments of variable colors and shades of grey from black to white is disposed in the light beam between the light source and the reflecting means and transmits light from the source to the mirror. The galvanometer mirror and the scale means are arranged relative to each other so that when the mirror is in the center or zero axis position, only white light is reflected to the recording medium and when it moves in one direction in response to the positive half cycle of the seismic signal, black and various shades of grey are reflected to the recording medium, and when it moves in the other direction, in response to the remaining half cycle, various colors are reflected to the recording medium.

The above object and other objects and advantages of the invention will be apparent from a more detailed description thereof when taken with the drawings wherein:

FIG. 1 is a schematic representation of a profile of the earth's subsurface illustrating the manner in which the original signals are obtained;

FIG. 2 is a schematic illustration of the electrical circuit used to form the composite signal in the preferred operation of the invention;

FIGS. 2A to 2E are enlarged views of the seismic signal and other signals to illustrate the manner in which the composite signal to be recorded is formed;

FIG. 3 is a schematic representation of the apparatus for recording the composite signal;

FIG. 4 is an elevation view of the color plate or scale means carrying the segments of black, white, shades of grey, and colors.

Figure 5:
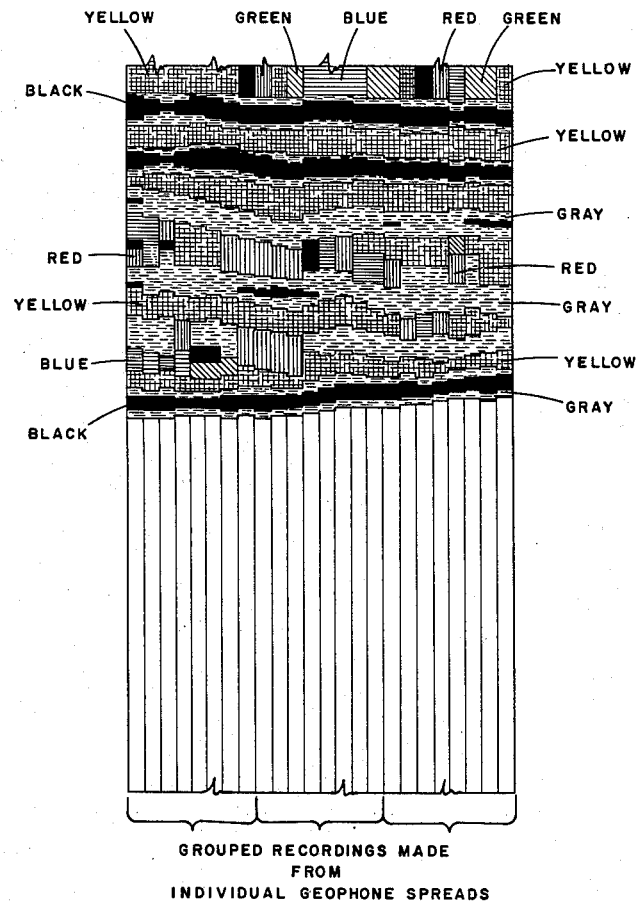
FIG. 5 is a reproduction of a recording or presentation made according to the preferred technique of the invention.

Reference is now made to the drawings in greater detail. In FIG. 1 there is shown a reflecting subsurface 10, a shock point 11, and surface pickups or geophones 12. The geophones or transducers 12 translate the reflected shock waves resulting from the explosion at shock point 11 into electrical signals representative of the seismic waves. The electrical signals are amplified by amplifiers 13 and recorded as indicated at 14.

The circuit shown in FIG. 2 shapes the electrical signals amplified by amplifier 13 if desired, and gates the half cycles of the signals to produce composite signals that are fed to a galvanometer mirror and photographically recorded as seen in FIG. 3.

FIGS. 2A to 2E illustrate the shaping and gating of the signal. Thus, the amplified signal of FIG. 2A is sent directly to gate 15 (to the grid of one of two vacuum tubes whose cathodes are connected together) along line 15a. It is also sent through a feed back limiter 16 which squares up the signal as seen in FIG. 2B. The squared voltage signal is transmitted to gate 15 (to the plate of the same tube to which the amplified signal is sent) through an inverter 17 which inverts the signal as illustrated in FIG. 2C. The inverted signal gates the seismic signal and permits its passage only during the positive half cycle thereof as indicated. The squared-up signal is also fed to a circuit which includes a peaker 18 and voltage follower 19 to produce a voltage proportional to the half-cycle breadth of the seismic signal (FIG. 2D) which voltage is transmitted to gate 15 (to the grid of the other tube). The squared-up signal is also fed directly to gate 15 (to the plate of the other tube) through line 15b to gate this frequency signal and pass it only during the other half cycle as indicated. The output composite signal of FIGS. 2A and 2D is illustrated in FIG. 2E.

The optical system is shown in FIG. 3 and as seen therein, a lamp or light source 30 projects light through color scale 31 onto galvanometer mirror 32, the pivotal position of which is determined by the composite signal. Light reflected from mirror 32 is projected through a collimating lens 34 onto a photographic medium 35 which comprises a rotatable drum 36 on which color film 37 is arranged.

FIG. 4 shows the color scale 31 in detail and as seen, it consists of a plate containing a number of transparent sections, some in color, one in black, one in white, and some in shades of grey. The center segment 5 is white or clear. On the left, segment 1 is black, and segments 2, 3, and 4 are in shades of grey. On the other side, various colors may be used for segments 6, 7, and 8. The color red is indicated for segment 9; however, another color may be used instead.

The operation of the method is as follows. The seismic signals produced by the shock waves are converted by geophones 12 to electrical signals which then are fed to the gating circuit of FIG. 2. The output of this circuit is a composite signal which comprises the positive half cycle of the seismic signal and in the other half cycle a voltage proportional to the half-cycle breadth of the seismic signal. This composite signal is sent to the galvanometer mirror 32 which pivots in response to variations in the signal. It pivots to the left and reflects and transmits to the photographic medium 37 through lens 34 light transmitted through the left side of color scale 31 and black or shades of grey are recorded. This movement is in response to the positive half cycle voltage. In response to the other half cycle voltage, the mirror 32 pivots to the right, and transmits and reflects light to the photographic medium 37 transmitted through the right side of color scale 31 and light in various colors is recorded.

An illustrative presentation of a recording made in this manner is shown in FIG. 5. The black and grey amplitude marks and the color frequency marks provide a desirable contrasting relationship.

The invention is not limited to the particular composite signal used to illustrate the invention. The use of other parameters is within the purview of the invention.

Thus, a composite signal presentation may be made of amplitude and total energy by displaying one half cycle of the seismic signal in shades of grey (variable density) and the total energy during the other half cycle in various colors. For this arrangement the total energy may be obtained by adding the kinetic and potential energies; the output of the geophone can be assumed to approximate the kinetic energy and the integrated output can be assumed to approximate the potential energy.

In addition, seismic amplitude may be displayed, both automatically gain controlled, and programmed gain controlled on the same presentation. For this arrangement the original seismic signal is amplified and limited to obtain a square wave gate which is used to display the automatic gain controlled seismic signal in shades of grey on the positive half cycle and the programmed seismic signal in color during the remaining half cycle.

Also, a composite signal of amplitude and a voltage proportional to full cycle breadth may be presented. In this case, the variable pulse may start at the positive going zero crossing and the amplitude taken from the positive peak, and the full period would be used to give the frequency information.

It is also within the scope of this invention to present together more than two parameters of the seismic signal. For example, a portion of one of the half cycles may be displayed as total energy, the remainder thereof displayed as frequency, and the other half cycle displayed as amplitude.

In any of the arrangements any desired combinations of parameters may be presented.

Having fully described the nature, operation, and apparatus of my invention, I claim:

1. A method for photographically recording seismic wave energy comprising:
   generating electrical signals in response to said seismic wave energy;
   feeding said electrical signals to gating circuit means to produce composite output signals representative of at least two parameters of said seismic wave energy; and
   then recording said composite output signals in a manner in which one of said parameters of said seismic wave energy is displayed in shades of grey and another of said parameters of said seismic wave energy is displayed in varying colors.

2. A method as recited in claim 1 in which said one parameter is amplitude and said other parameter is frequency.

3. A method as recited in claim 1 for photographically recording electrical signals generated in response to seismic wave energy comprising displaying the positive half cycle of said signals in shades of grey and displaying a voltage proportional to the half-cycle breadth of the signals in the remaining half cycle in varying colors.

4. A method for photographically recording electrical signals generated in response to seismic wave energy comprising:
   producing composite electrical signals representative of two parameters of said seismic wave energy;
   directing a beam of light through a color scale means onto a deflectable reflecting surface;
   a portion of the length of said color scale means transmitting to said reflecting surface black and varying shades of grey when said reflecting surface is directed to a first series of positions, and varying colors when directed to a second series of positions;
   transmitting light reflected from said reflecting surface to a photographic medium, the particular portion of said color scale means selected for transmission of light from said reflecting surface being determined by the degree of deflection of said reflecting surface; and the degree of deflection of said reflecting surface to said first and second series of positions being responsive to and dependent upon said composite electrical signals.

References Cited by the Examiner

UNITED STATES PATENTS

| | | | |
|---|---|---|---|
| 2,769,683 | 11/56 | Skelton | 346—109 |
| 2,875,017 | 2/59 | Reynolds | 346—109 |
| 2,937,915 | 5/60 | Peterson | 346—109 |
| 2,944,620 | 7/60 | Van Dijck | 181—0.5 |
| 2,976,106 | 3/61 | Piety | 346—109 |
| 2,976,107 | 3/61 | Klein et al. | 346—109 |
| 3,011,856 | 12/61 | Palmer et al. | 346—109 |
| 3,024,079 | 3/62 | Salvatori et al. | 336—109 |
| 3,025,123 | 3/62 | Klein | 346—34 |
| 3,034,127 | 5/62 | Walling et al. | 346—109 |
| 3,045,241 | 6/62 | Sairt | 346—109 |
| 3,048,846 | 8/62 | Martin | 346—1 |
| 3,050,731 | 8/62 | Usdin | 346—1 |
| 3,061,813 | 10/62 | Geyer | 340—15.5 |
| 3,097,562 | 7/63 | Gurrola et al. | 88—24 |

LEYLAND M. MARTIN, *Primary Examiner.*